United States Patent
Haley et al.

(10) Patent No.: US 8,915,653 B2
(45) Date of Patent: Dec. 23, 2014

(54) OPTICAL CONNECTOR HOUSING ASSEMBLY WITH DUAL INSERTION AND EXTRACTION OPTIONS

(71) Applicant: Tyco Electronics Corporation, Berwyn, PA (US)

(72) Inventors: Edmund Joseph Haley, Dillsburg, PA (US); David Robert Baechtle, Dillsburg, PA (US)

(73) Assignee: Tyco Electronics Corporation, Berwyn, PA (US)

( * ) Notice: Subject to any disclaimer, the term of this patent is extended or adjusted under 35 U.S.C. 154(b) by 0 days.

(21) Appl. No.: 13/840,319

(22) Filed: Mar. 15, 2013

(65) Prior Publication Data

US 2014/0270646 A1    Sep. 18, 2014

(51) Int. Cl.
*G02B 6/36* (2006.01)
*G02B 6/38* (2006.01)

(52) U.S. Cl.
CPC .................................... *G02B 6/3893* (2013.01)
USPC ........................................................ 385/70

(58) Field of Classification Search
CPC .. G02B 6/3801; G02B 6/3806; G02B 6/3825; G02B 6/3874; G02B 6/3877
USPC ......................................................... 385/70
See application file for complete search history.

(56) References Cited

U.S. PATENT DOCUMENTS

| | | | |
|---|---|---|---|
| 6,290,527 B1 | 9/2001 | Takaya et al. | |
| 2003/0044129 A1* | 3/2003 | Ahrens et al. | 385/92 |
| 2004/0101253 A1 | 5/2004 | Jong et al. | |
| 2005/0094948 A1 | 5/2005 | Ohtera | |
| 2005/0118880 A1 | 6/2005 | Reichle | |
| 2008/0240658 A1 | 10/2008 | Leeman et al. | |

OTHER PUBLICATIONS

International Search Report, International Application No. PCT/US2014/027604, International Filing Date Mar. 14, 2014.

* cited by examiner

*Primary Examiner* — Jerry Blevins

(57) ABSTRACT

A housing for an optical connector including a top wall, a bottom wall, a first side wall and a second side wall forming a passageway and a rear opening; a rear portion for receiving a first optical connector; a rectangular opening located on the top wall of the rear portion, wherein the rectangular opening extending from the rear opening along length of the rear portion of the top wall; a rectangular channel located on the bottom wall extending from the rear opening, wherein width of the channel is substantially equal to width of a stop located on distal end of the bottom wall of the connector; and a first notch located on the first side wall and a second notch located on the second side wall, wherein the first and second notches are capable of engaging with projections located on the connector when the connector is inserted into the housing.

15 Claims, 6 Drawing Sheets

OPTICAL CONNECTOR HOUSING ASSEMBLY WITH DUAL INSERTION AND EXTRACTION OPTIONS

FIELD OF THE INVENTION

The present invention generally relates to an optical connector-housing assembly, and, more particularly, to an optical connector assembly including an optical connector and a connector housing with dual insertion and extraction options.

BACKGROUND OF THE INVENTION

Fiber optic connector assemblies include fiber optic connectors that are mated together to transmit signals there through. Some systems use assemblies that have housings that hold multiple fiber optic connectors and simultaneously mate multiple fiber optic connectors. In known systems, the housings are mated together in a direction that is generally parallel to the connector axes. However, a large area or space is needed in rear or front of at least one of the assemblies to position the other assembly for mating. In some applications, space may be limited in rear or front of the assembly, making mating of the assemblies difficult.

Consequently, a need exists for a fiber optical connector-housing assembly that allows fiber optic connector-housing assemblies to be mated in tight spaces or in directions that are different from known systems.

SUMMARY OF THE INVENTION

The present invention provides an optical connector assembly including an optical connector and a connector housing. More particularly, the present invention relates to an optical connector-housing assembly including an optical connector and a connector housing in which connector can be inserted into the connector housing from either a top opening or a rear opening. Inventors of the present invention have discovered that the combination of features in the optical connection system in accordance with the present invention provides for a convenient method of engaging an optical connector with a connector housing in tight and/or compact spaces. Inventors of the present invention have observed that when a connector housing is surrounded by other electronic or optical components, insertion of an optical connector into the connector housing from the rear opening in the connector housing is difficult. Inventors have solved this problem by providing an opening located on top wall of connector housing allow insertion of an optical connector without being impeded by electronic or optical components surrounding the connector housing. This further allows for circuit board designs that are compact in nature where components can be placed in close proximity to the connector housing.

Accordingly, the present invention relates to a housing for an optical connector comprising a top wall, a bottom wall, a first side wall and a second side wall forming a passageway and a rear opening; a rear portion for receiving a first optical connector; a rectangular opening located on the top wall of the rear portion, wherein the rectangular opening extending from the rear opening along length of the rear portion of the top wall; a rectangular channel located on the bottom wall extending from the rear opening, wherein width of the channel is substantially equal to width of a stop located on distal end of the bottom wall of the connector; and a first notch located on the first side wall and a second notch located on the second side wall, wherein the first and second notches are capable of engaging with projections located on the connector when the connector is inserted into the housing. More specifically, the passageway is capable of receiving the proximal end of the connector. In one embodiment of the present invention the rectangular opening located on the top wall is capable of receiving the proximal end of the connector. In a second embodiment of the present invention, the channel engages with the stop to prevent the connector from extending into the front portion when the connector is inserted into the housing.

In another embodiment of the present invention, a portion of the edges of the rectangular opening located on the top wall is turned inwardly to provide a ramp without sharp edges. More specifically, the ramp is capable of depressing projections provided on the outer surface of the side walls of the connector when the proximal end of the connector body is inserted into the connector housing passageway from the top opening.

In yet another the passageway and the rear opening have a rectangular cross-section, wherein the passageway and the rear opening is capable of receiving the connector, and wherein cross-section of the connector is rectangular.

In some embodiments of the present invention, the housing for an optical connector further includes a front portion for receiving a second optical connector, wherein the first and second connectors are complementary to each other.

In embodiments in accordance with the present invention, engaging of the notches with projections on the connector aligns the connector to a complementary connector received in the front portion of the housing.

Another aspect of the present invention relates to a housing for an optical connector comprising a top wall, a bottom wall, a first side wall and a second side wall forming a passageway and a rear opening, both having a rectangular cross-section; a rear portion for receiving a first optical connector; a front portion for receiving a second optical connector, wherein the first and second connectors are complementary to each other; a rectangular opening located on the top wall of the rear portion, wherein the rectangular opening extending from the rear opening of the passageway along length of the rear portion of the top wall, wherein the rectangular opening is capable of receiving the proximal end of the connector; a rectangular channel located on the bottom wall extending from the rear opening, wherein width of the channel is substantially equal to width of a stop located on distal end of the bottom wall of the connector, and wherein the channel engages with the stop to prevent the connector from extending into the front portion when the connector is inserted into the housing; and a first notch located on the first side wall and a second notch located on the second side wall, wherein the first and second notches are capable of engaging with projections located on the connector when the connector is inserted into the housing.

DETAILED DESCRIPTION

Figure 1:
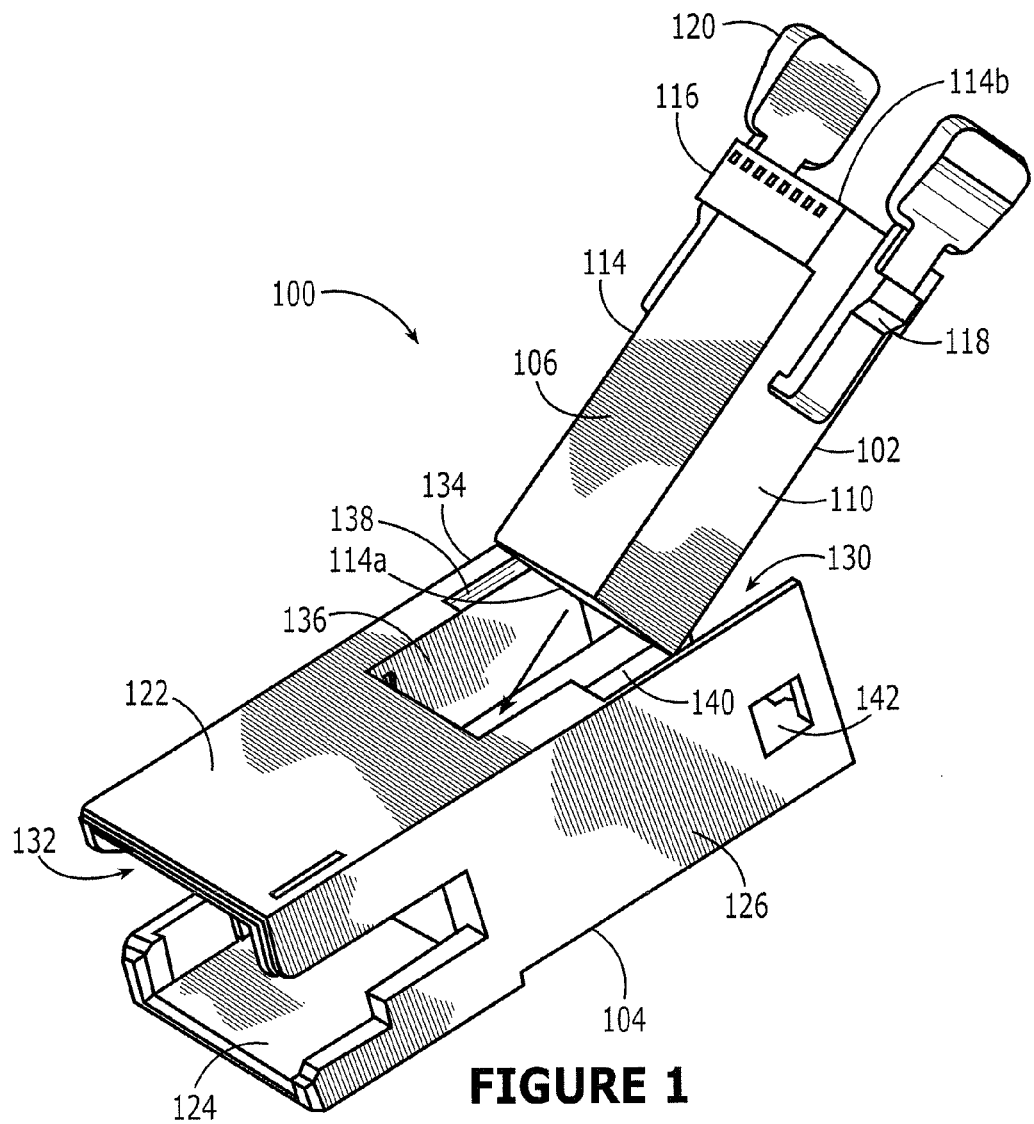
FIG. 1 is a perspective view of an optical connector in accordance with an embodiment of the present invention.

Referring now to the drawings, and more particularly, to FIG. 1, there is shown an optical connector-housing assembly, generally designated 100, which comprises or incorporates the embodiments of the present invention. Optical connector-housing assembly 100 includes an optical connector 102 and a connector housing 104.

Connector 102 includes a top wall 106, bottom wall 108 (not shown), first side wall 110 and second side wall 112 (not shown). All walls 106-112 together form connector body 114 having a rectangular cross-section. Outer surface of top wall 106 and bottom wall 108 are raised along the edges at distal end 114b of connector body 114 to form a stop 116. Outer surface of side walls 110 and 112 are provided with projections 118 to secure to notches 142 of connector housing 104 when proximal end 114a of connector 102 is inserted into connector housing 104. Latches or tabs 120 are provided on side walls 110-112 to release connector 102 from connector housing 104. By depressing tabs 120 inward, projections 118 can be unsecured from notches and by pulling connector 102 away from connector housing 104 while tabs 120 are depressed will release connector 102 from connector housing 104.

Connector housing 104 includes a top wall 122, bottom wall 124 (not shown), first side wall 126 and second side wall 128 (not shown). All walls 122-128 together form a passageway having a rectangular cross-section and a rear opening 130. Connector housing 104 includes a front portion 132 for receiving a complementary optical connector (not shown) and a rear portion 134 for receiving optical connector 102. Front portion 132 of connector housing 104 provide mating features for a complementary connector. In one embodiment of the present invention, connector housing 104 is a single-piece construction rather than a typical two-piece nested construction used for factory-termination. Exemplary material that can be used for constructing connector housing 104 include PES, PEI, PBT, LCP, and the like. Dimensions of rear portion 134 of connector housing 104 passage way is slightly larger than dimensions of proximal end 114a of connector 102 such that connector housing 104 passageway can receive connector 102.

Top wall 122 of rear portion 134 includes a rectangular opening 136 starting from rear opening of passageway and extending along length of rear portion 134 top wall 122. Width of rectangular opening 136 corresponds to width of body 114 of optical connector 102. A portion of the edges of rectangular opening 136 near rear end of rectangular opening 136 turns inwardly to provide a ramp 138 without sharp edges. In some embodiments of the present invention, all edges of rectangular opening 136 near rear end of rectangular opening 136 turns inwardly to provide a ramp without sharp edges.

Bottom wall 124 includes a rectangular recess or channel 140 extending from the rear, and having a width that is same as, or slightly larger than, the width of stop 116. When connector 102 is inserted into connector housing 104 from rear, stop 116 engages with channel 140 to prevent connector 102 from extending into front portion 132.

Notches 142 are provided near rear end of first and second side wall 126-128 to secure projections 118 of connector housing 104 when connector 102 is inserted into connector housing 104. Locations of notches 142 on side walls 126-128, in combination with top wall 122 and bottom wall 124 aligns connector 102 to a complementary connector on front portion 132 such that the connector axis of fiber optic connector 102 is aligned with corresponding connector axis of the corresponding complementary fiber optic connector in the front portion 132.

Figure 2:
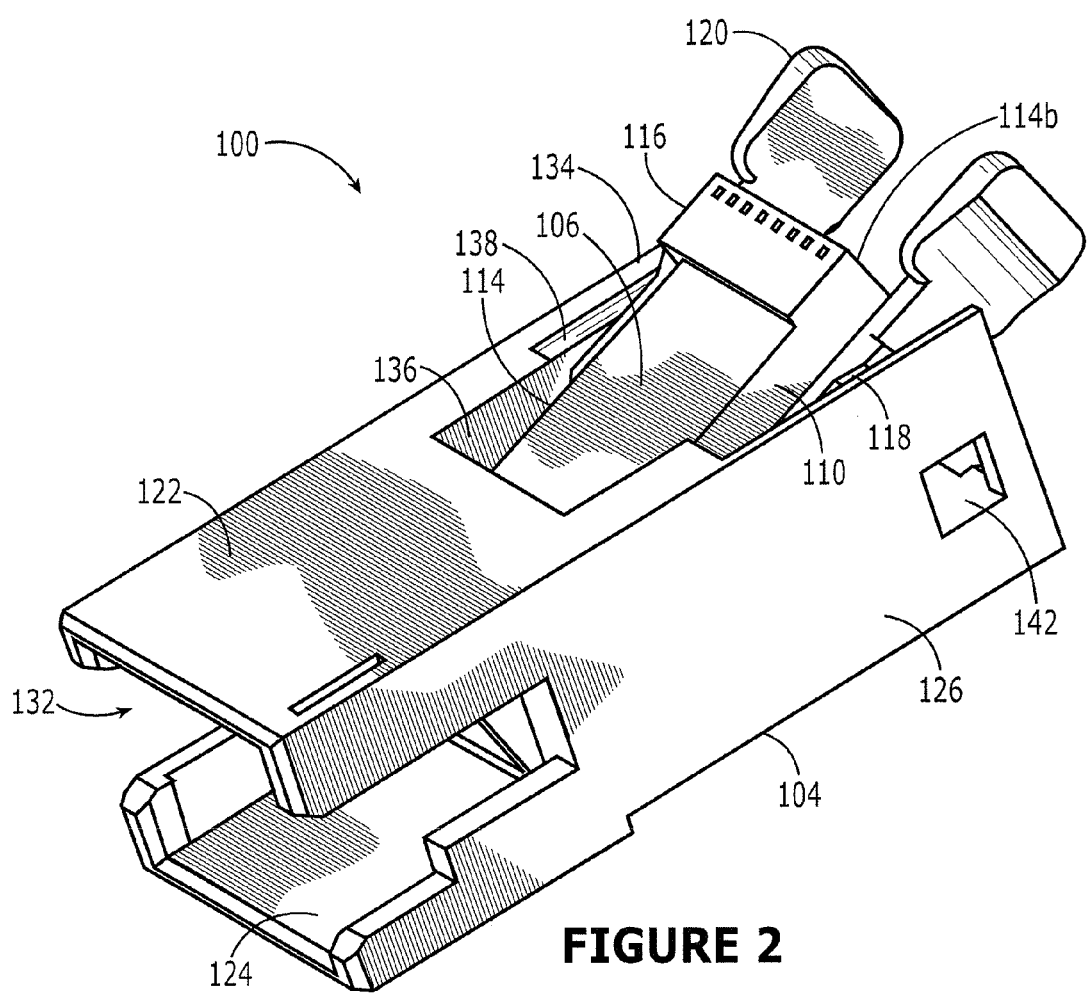
FIG. 2 illustrates a first insertion step of an optical connector into a connector housing from a top opening of the connector housing.
Figure 3:
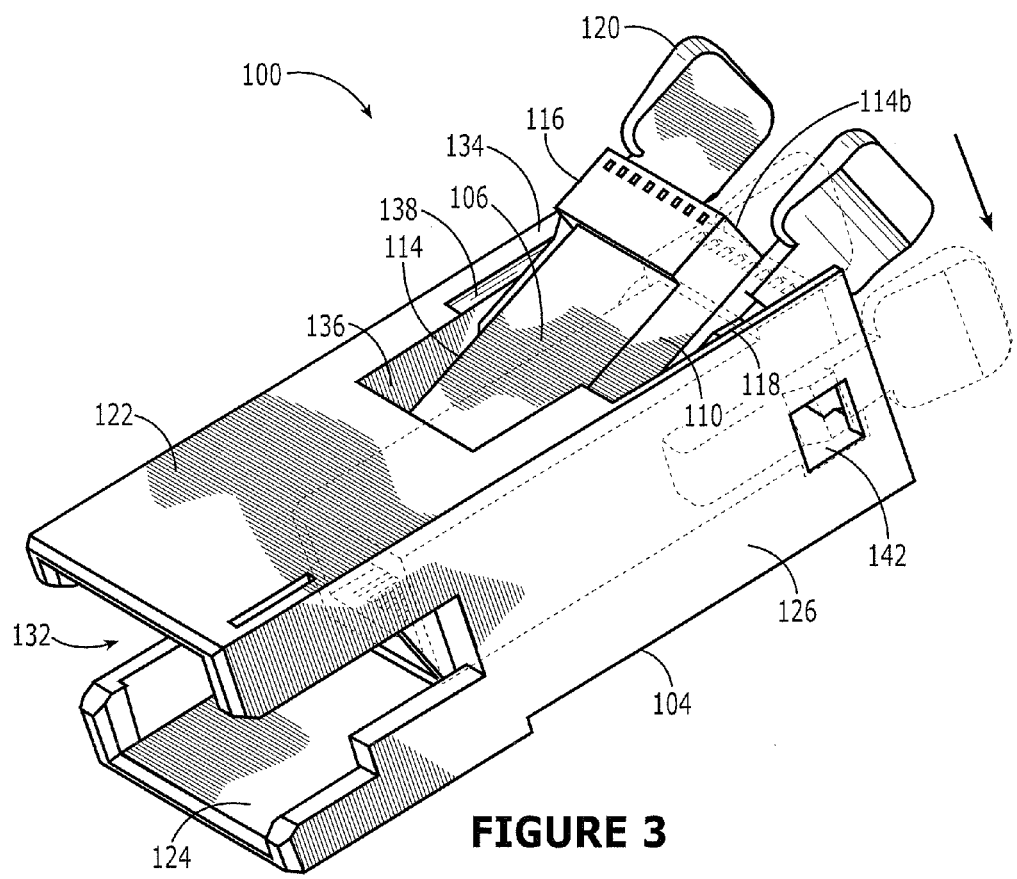
FIG. 3 illustrates a second insertion step of an optical connector into a connector housing from a top opening of the connector housing.
Figure 4:
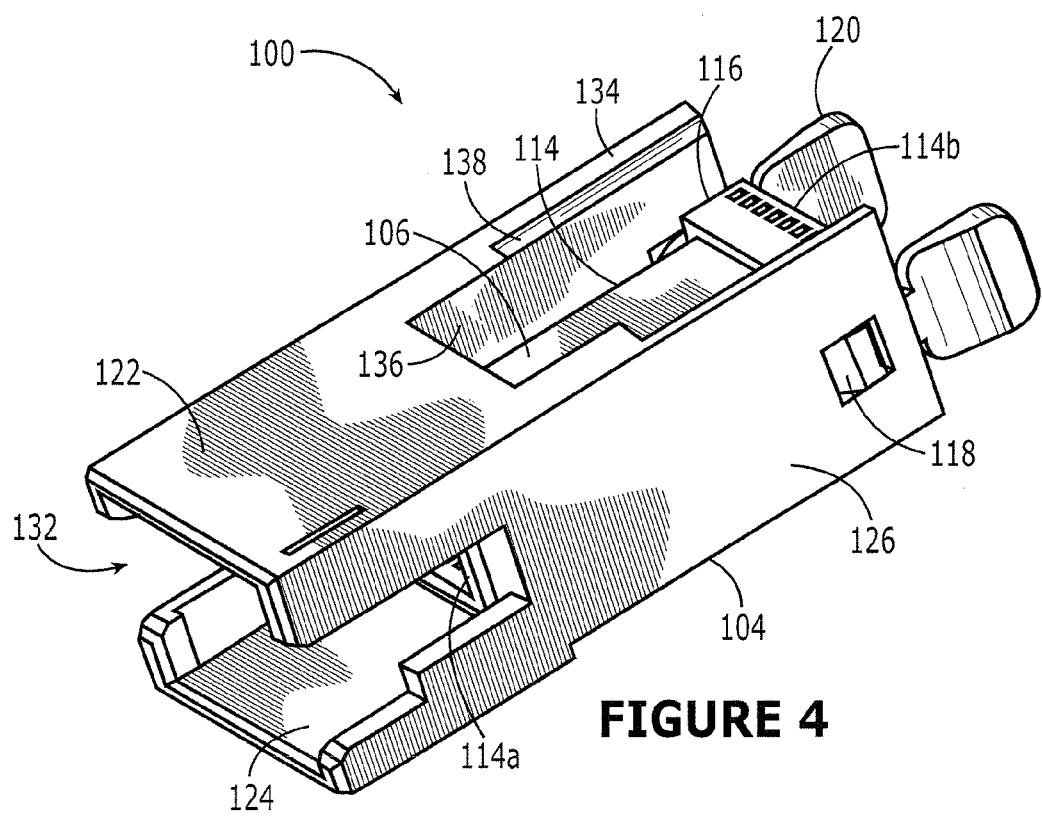
FIG. 4 illustrates complete insertion of an optical connector into a connector housing from a top opening of the connector housing.

Embodiments in accordance with the present invention allow for connector 102 to engage with rear portion 134 of connector housing 104 either from top opening 136 or from rear opening 130. When proximal end 114a of connector body 114 is inserted into connector housing 104 passageway from top opening 136, ramp 138 depresses projections 118 inwards to allow connector body 114 to slide into connector housing 104 passageway. At this stage, longitudinal axis of connector body 114 forms an acute angle (less than 90°) with the longitudinal axis of connector housing 104 passageway. During this type of connector insertion from top opening 136, connector body 114 slides into connector housing 104 passageway until bottom edge of connector body 114 contacts bottom wall 124 of connector housing, as shown in FIG. 2. In order to achieve further insertion such that longitudinal axis of connector body 114 is parallel to the longitudinal axis of connector housing 104 passageway, distal end 114b of connector body 114 is pushed in a direction substantially perpendicular to the longitudinal axis of connector housing 104 passageway, as shown in FIG. 3. When distal end 114b of connector body 114 is pushed in a direction substantially perpendicular to the longitudinal axis of connector housing 104 passageway, connector body 114 slides further into connector housing 104 passageway. As connector body 114 slides further into connector housing 104 passageway, ramp 138 maintains projections 118 in a depressed state until projections 118 engages with notches 142. Further, stop 116 engages with channel 140 to prevent connector 102 from sliding into front portion 132. Engaging projections 118 with notches 142 on side walls 126-128, and stop 116 with channel 140, aligns connector 102 with a longitudinal axis of connector housing 104, as shown in FIG. 4. This further aligns the connector axis of connector 102 with corresponding connector axis of the corresponding complementary fiber optic connector in front portion 132.

Figure 5:
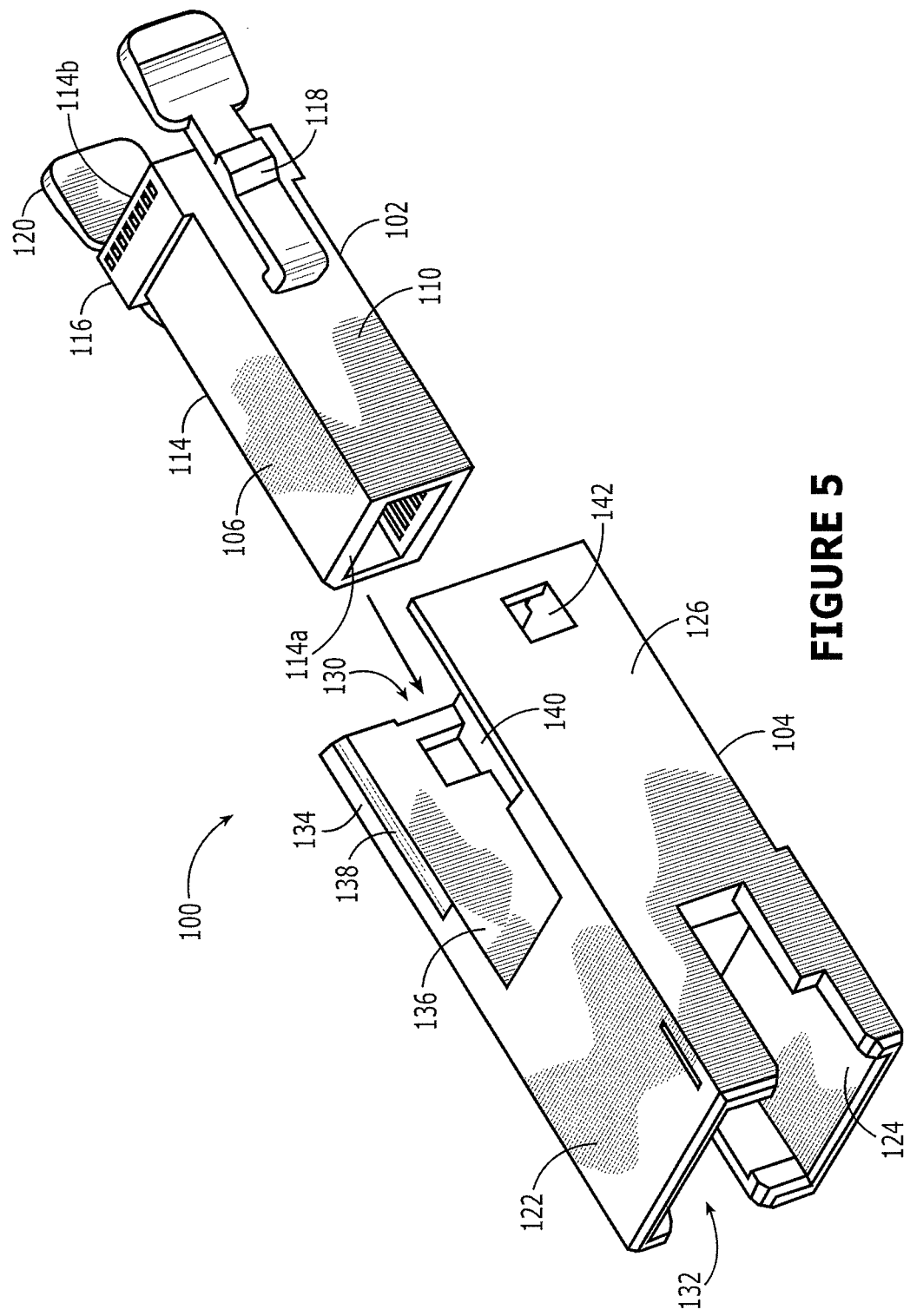
FIG. 5 illustrates insertion step of an optical connector into a connector housing from a rear opening of the connector housing.
Figure 6:
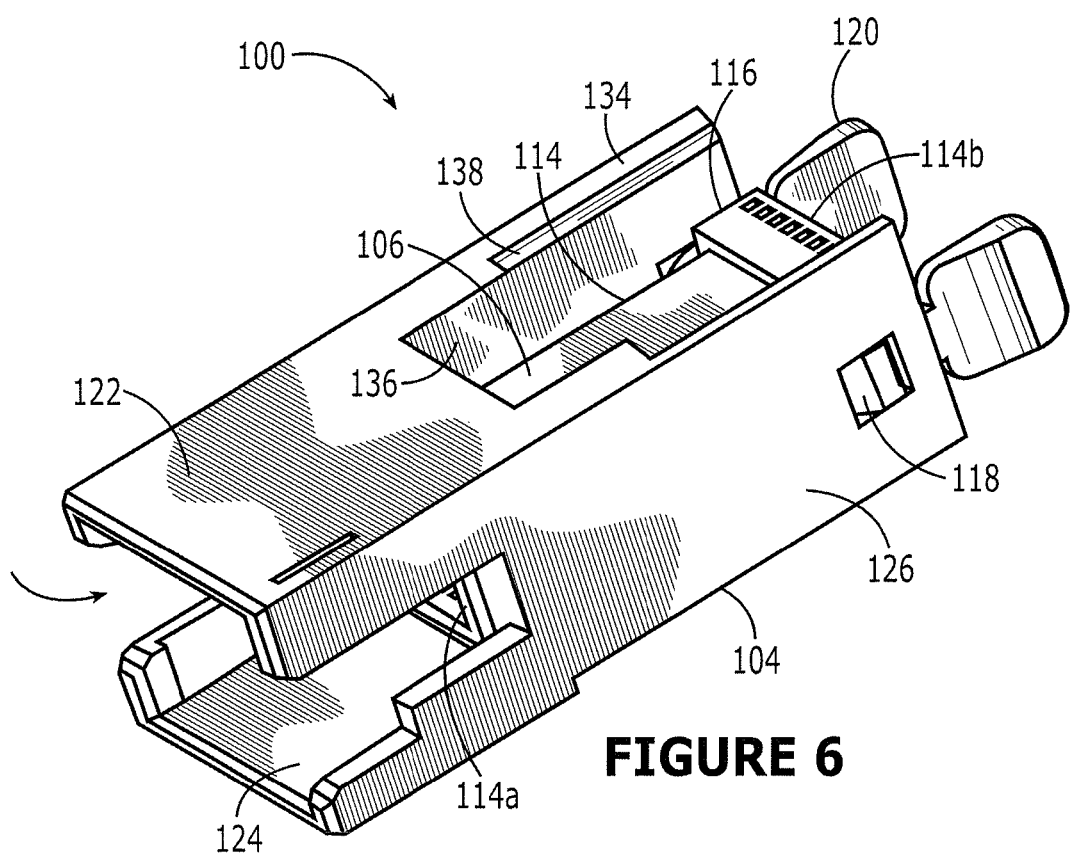
FIG. 6 illustrates complete insertion of an optical connector into a connector housing from a rear opening of the connector housing.

When proximal end 114a of connector body 114 is inserted into connector housing 104 passageway from rear opening 130, ramp (not shown) on back edges of side walls 126 and 128 depresses projections 118 inwards to allow connector body 114 to slide into connector housing 104 passageway, as shown in FIG. 5. In order to achieve further insertion, distal end 114b of connector body 114 is pushed in a direction parallel to longitudinal axis of connector housing 104 passageway, as shown in FIG. 5. As connector body 114 slides further into connector housing 104 passageway, ramp (not shown) on back edges of side walls 126 and 128 maintains projections 118 in a depressed state until projections 118 engages with notches 142. Further, stop 116 engages with channel 140 to prevent connector 102 from sliding into front portion 132. Engaging projections 118 with notches 142 on side walls 126-128, and stop 116 with channel 140, aligns connector 102 with a longitudinal axis of connector housing 104, as shown in FIG. 6. This further aligns the connector axis of connector 102 with corresponding connector axis of the corresponding complementary fiber optic connector in the front portion 132. Thus, in embodiments in accordance with the present invention either top opening 136 or rear opening 130 can be used to connector 102 with connector housing 104.

Embodiments in accordance with the present invention can be used to engage connector 102 with connector housing 104 in tight and/or compact spaces. When connector housing 104 is surrounded by other electronic or optical components, insertion of connector 102 into connector housing 104 from the rear opening 130 can be difficult. In these scenarios, embodiments in accordance with the present invention allow insertion of connector 102 from opening 136 located on top wall 122. After inserting connector 102 into connector housing 104 for a sufficient distance from top opening, connector 102 can be pushed down to engage projections 118 into notches 142 and thus secure connector 102 in connector housing 104. This further allows for circuit board designs that are compact in nature where components can be placed in close proximity to the connector housing 104 and connector 102 can still be engaged with connector housing 104 without being impeded by surrounding components.

It is thought that the optical connector system of the present invention and many of its attendant advantages will be understood from the foregoing description and it will be apparent that various changes may be made in the form, construction arrangement of parts thereof without departing from the spirit and scope of the invention or sacrificing all of its material advantages, the form hereinbefore described being merely a preferred or exemplary embodiment thereof.

What is claimed is:

1. A housing for an optical connector comprising:
   a top wall, a bottom wall, a first side wall and a second side wall forming a passageway and a rear opening;
   a rear portion for receiving a first optical connector;
   a rectangular opening located on the top wall of the rear portion, the rectangular opening extending from the rear opening along a length of the rear portion of the top wall, and having a plurality of edges located on the top wall of the rear portion, a portion of the edges turned inwardly to provide a ramp;
   a rectangular channel located on the bottom wall extending from the rear opening, wherein width of the channel is substantially equal to width of a stop located on distal end of the bottom wall of the connector; and
   a first notch located on the first side wall and a second notch located on the second side wall, wherein the first and second notches are capable of engaging with projections located on the connector when the connector is inserted into the housing.

2. The housing of claim 1, further comprising a front portion for receiving a second optical connector, wherein the first and second connectors are complementary to each other.

3. The housing of claim 1, wherein the passageway is capable of receiving the proximal end of the connector.

4. The housing of claim 1, wherein the rectangular opening located on the top wall is capable of receiving the proximal end of the connector.

5. The housing of claim 1, wherein the ramp does not include sharp edges.

6. The housing of claim 1, wherein the ramp is capable of depressing the projections on the connector when the proximal end of the connector body is inserted into the connector housing passageway from the top opening.

7. The housing of claim 1, wherein the passageway and the rear opening have a rectangular cross-section, wherein the passageway and the rear opening is capable of receiving the connector, and wherein cross-section of the connector is rectangular.

8. The housing of claim 1, wherein the engaging of the notches with projections on the connector aligns the connector to a complementary connector received in the front portion of the housing.

9. A housing for an optical connector comprising:
   a top wall, a bottom wall, a first side wall and a second side wall forming a passageway and a rear opening;
   a rear portion for receiving a first optical connector;
   a front portion for receiving a second optical connector;
   a rectangular opening located on the top wall of the rear portion, the rectangular opening extending from the rear opening alone length of the rear portion of the top wall;
   a rectangular channel located on the bottom wall extending from the rear opening, wherein width of the channel is substantially equal to width of a stop located on distal end of the bottom wall of the connector; and
   a first notch located on the first side wall and a second notch located on the second side wall, wherein the first and second notches are capable of engaging with projections located on the connector when the connector is inserted into the housing;
   wherein the channel engages with the stop to prevent the connector from extending into the front portion when the connector is inserted into the housing.

10. A housing for an optical connector comprising:
    a top wall, a bottom wall, a first side wall and a second side wall forming a passageway and a rear opening, both having a rectangular cross-section;
    a rear portion for receiving a first optical connector;
    a front portion for receiving a second optical connector, wherein the first and second connectors are complementary to each other;
    a rectangular opening located on the top wall of the rear portion, wherein the rectangular opening extending from the rear opening of the passageway along length of the rear portion of the top wall, wherein the rectangular opening is capable of receiving the proximal end of the connector;
    a rectangular channel located on the bottom wall extending from the rear opening, wherein width of the channel is substantially equal to width of a stop located on distal end of the bottom wall of the connector, and wherein the channel engages with the stop to prevent the connector from extending into the front portion when the connector is inserted into the housing; and
    a first notch located on the first side wall and a second notch located on the second side wall, wherein the first and second notches are capable of engaging with projections located on the connector when the connector is inserted into the housing.

11. The housing of claim 10, wherein the passageway is capable of receiving the proximal end of the connector.

12. The housing of claim 10, wherein a portion of the edges of the rectangular opening is turned inwardly to provide a ramp without sharp edges.

13. The housing of claim 12, wherein the ramp is capable of depressing the projections on the connector when the proximal end of the connector body is inserted into the connector housing passageway from the top opening.

14. The housing of claim 10, wherein the passageway and the rear opening is capable of receiving the connector, and wherein cross-section of the connector is rectangular.

15. The housing of claim 10, wherein the engaging of the notches with projections on the connector aligns the connector to a complementary connector received in the front portion of the housing.

* * * * *